United States Patent
Byrd et al.

(10) Patent No.: US 9,416,724 B2
(45) Date of Patent: Aug. 16, 2016

(54) MULTI-STAGED WASTEGATE

(75) Inventors: Kevin Durand Byrd, Royal Oak, MI (US); Keith Michael Plagens, Northville, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 13/570,025

(22) Filed: Aug. 8, 2012

(65) Prior Publication Data

US 2014/0041380 A1 Feb. 13, 2014

(51) Int. Cl.
 F02D 23/00 (2006.01)
 F02B 37/12 (2006.01)
 F02B 37/16 (2006.01)
 F02B 37/18 (2006.01)

(52) U.S. Cl.
 CPC ............... F02B 37/12 (2013.01); F02B 37/16 (2013.01); F02B 37/18 (2013.01); Y02T 10/144 (2013.01)

(58) Field of Classification Search
 CPC ..... Y02T 10/144; F02B 37/183; F02B 37/18; F02B 37/186; F02B 37/00; F02B 37/16; F02D 41/0007; F02D 23/00
 USPC .................. 60/600, 605.1, 280, 602; 251/298
 See application file for complete search history.

(56) References Cited

U.S. PATENT DOCUMENTS

| | | | |
|---|---|---|---|
| 5,046,317 A | 9/1991 | Satokawa | |
| 8,196,403 B2* | 6/2012 | Hittle et al. | 60/602 |
| 8,459,025 B2* | 6/2013 | Schwarte | 60/602 |
| 8,499,557 B2* | 8/2013 | Grabowska | 60/602 |
| 8,528,327 B2* | 9/2013 | Bucknell et al. | 60/602 |
| 2007/0089413 A1* | 4/2007 | Green et al. | 60/600 |
| 2007/0204616 A1* | 9/2007 | Martin et al. | 60/602 |
| 2009/0151352 A1 | 6/2009 | McEwan et al. | |
| 2011/0061381 A1* | 3/2011 | Harris et al. | 60/612 |
| 2011/0126812 A1* | 6/2011 | Miyashita | 123/703 |
| 2012/0000196 A1 | 1/2012 | Niwa et al. | |
| 2012/0060492 A1* | 3/2012 | Pursifull et al. | 60/602 |

FOREIGN PATENT DOCUMENTS

WO 9841744 A1 9/1998

* cited by examiner

Primary Examiner — Thomas Denion
Assistant Examiner — Thomas Olszewski
(74) Attorney, Agent, or Firm — Julia Voutyras; Alleman Hall McCoy Russell & Tuttle LLP

(57) ABSTRACT

Embodiments for controlling boost pressure are provided. In one example, a method of controlling a turbocharger of an engine via a multi-staged wastegate comprises during a first condition, actuating a first stage of the wastegate based on boost pressure generated by the turbocharger, and actuating a second stage of the wastegate based on a temperature of a catalyst downstream of the turbocharger. In this way, catalyst heating and boost control may be provided by a common wastegate.

18 Claims, 5 Drawing Sheets

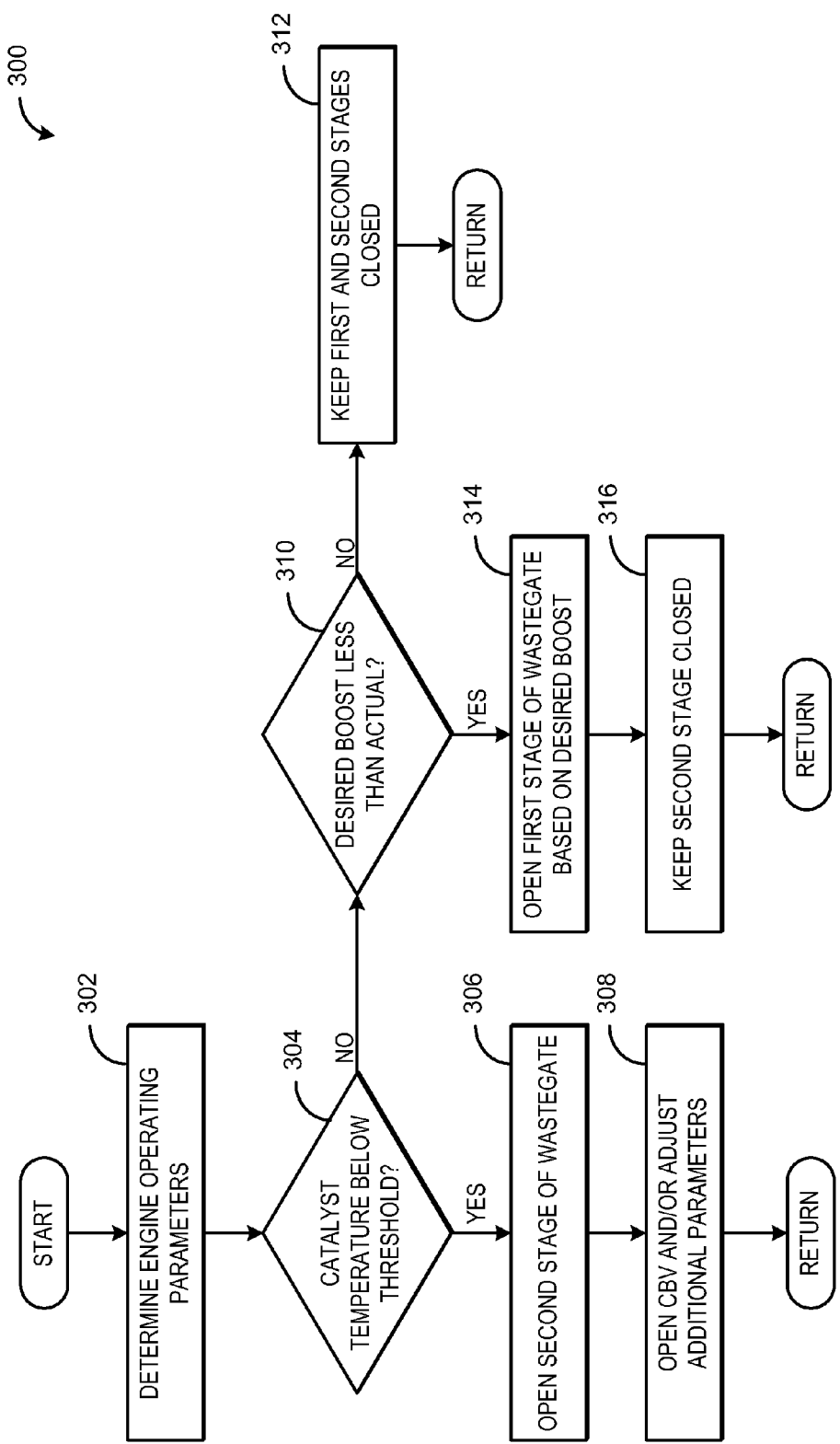

MULTI-STAGED WASTEGATE

FIELD

The present disclosure relates to a wastegate for a turbocharger.

BACKGROUND AND SUMMARY

Before reaching its operating temperature, significant emissions may bypass a catalyst positioned in an engine exhaust. Thus, a common strategy for improving cold start emissions is to increase the heat flux through the engine in order to bring the catalyst up to operating temperature. However, the exhaust system may lose heat between the engine and catalyst, as the length of travel, surface area, number and shape of bends, heat flux, heat transfer coefficients, etc., between the combustion chamber and the catalyst face may pose significant opportunities for heat loss. A turbocharger added along this pathway will absorb a significant and measureable amount of heat that may also delay the catalyst light off time. The turbocharger may also have a negative impact on cold start fuel economy as more air and fuel are needed to overcome this additional heat loss.

One solution for minimizing heat loss via the turbocharger is to divert some or all of the exhaust around the turbocharger and straight to the catalyst, for example by opening a wastegate associated with a turbine positioned in the exhaust. However, wastegates are typically sized to provide optimal flow control for regulating the amount of boost provided by the turbocharger, and even if fully opened, may not provide a high enough level of diversion to rapidly heat a catalyst.

The inventors herein have recognized the above issues and provide an approach to at least partly address them. In one embodiment, a method of controlling a turbocharger of an engine via a multi-staged wastegate includes during a first condition, actuating a first stage of the wastegate based on boost pressure generated by the turbocharger, and actuating a second stage of the wastegate based on a temperature of a catalyst downstream of the turbocharger.

In this way, both boost control and rapid catalyst heating may be provided by a common wastegate. In one example, the wastegate may include a first stage arranged on a second stage. The first stage may be opened based on a desired boost pressure. The second stage may be kept closed while the first stage is open, and may include an opening that is regulated by the first stage. The second stage may be opened when maximal turbine bypass is desired, such as when catalyst temperature is below light-off temperature. By doing so, a relatively large amount of exhaust may bypass the turbine to rapidly heat the catalyst while still allowing for precise control of boost pressure, without the provision of additional bypass lines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a flow chart illustrating a method for controlling a multi-stage wastegate according to an embodiment of the present disclosure.

DETAILED DESCRIPTION

Figure 1:
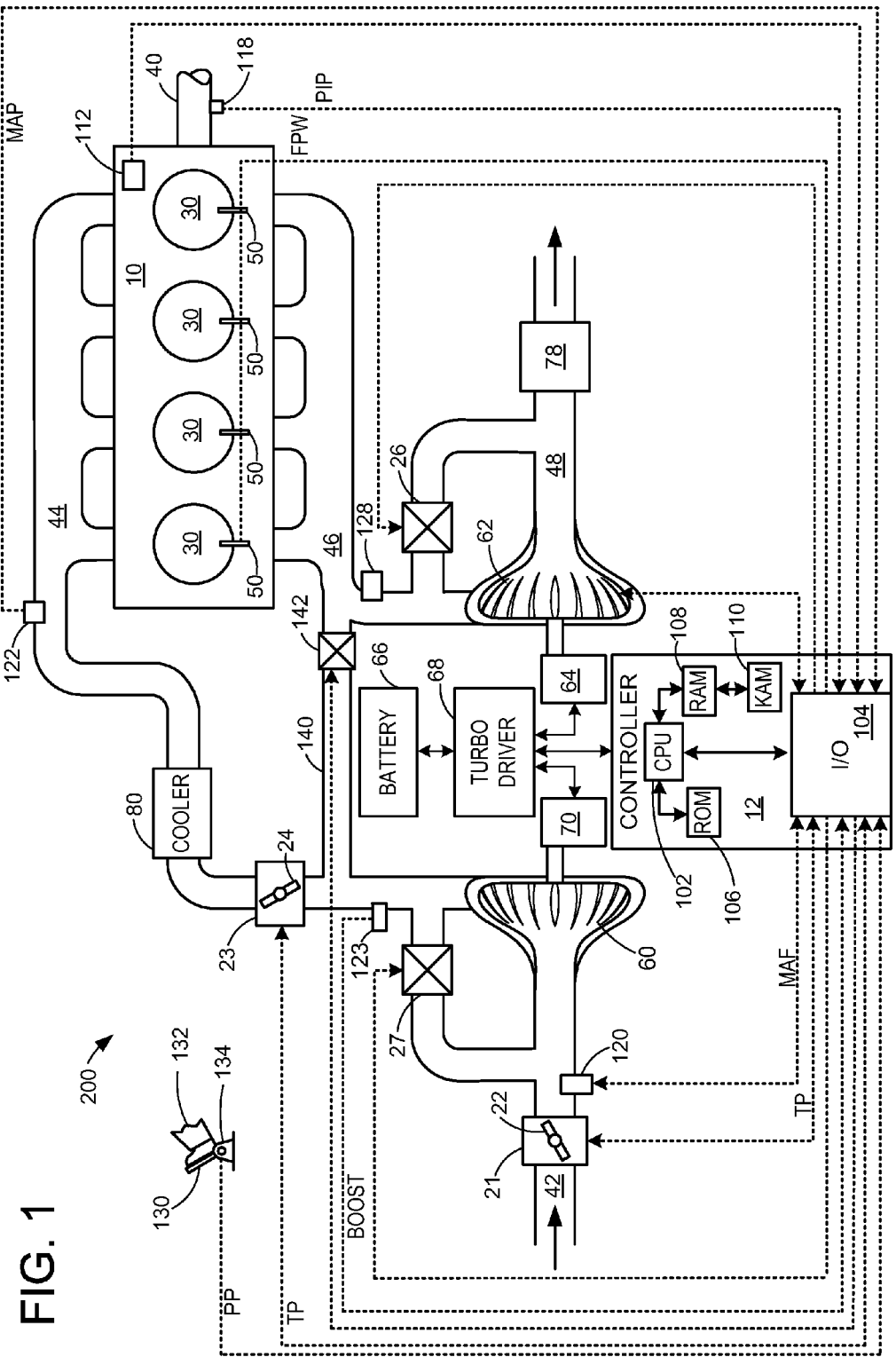
FIG. 1 shows an example multi-cylinder engine including a turbocharger.

A wastegate may be provided in an engine exhaust system to facilitate bypass of exhaust gas around a turbocharger turbine, for example to ensure boost generated by the turbocharger does not exceed a desired limit. Wastegates are typically sized to provide precise control of boost pressure. Due to this constraint, wastegates are often limited in the amount of bypass they may provide. Under certain conditions, such as when heating a catalyst, additional bypass beyond the amount allowed by the wastegate may be desired to avoid cooling the exhaust by passage through the turbine. A multi-staged wastegate may be configured with a first stage sized and controlled to provide desired boost regulation, while also including a second stage, larger than the first, to provide additional bypass. The dual-stage wastegate may be configured as a double-poppet valve or other suitable configuration. FIG. 1 is an example engine system including a multi-staged wastegate, illustrated in more detail in FIGS. 2A-2C, and a controller configured to carry out the methods illustrated in FIGS. 3-5.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an electric motor or actuator included with throttles 21 and 23, a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF and MAP to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Additional detail regarding wastegate 26 will be presented below. Intake passage 42 may include a compressor bypass valve 27 configured to divert intake air around compressor 60. Wastegate 26 and/or compressor bypass valve 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 2A:
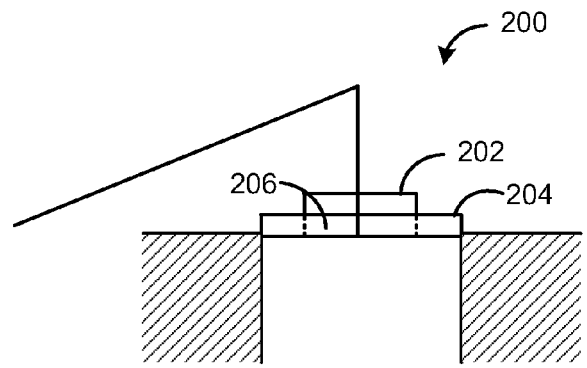
FIGS. 2A-2C show an example two-staged wastegate in various positions.
Figure 2B:
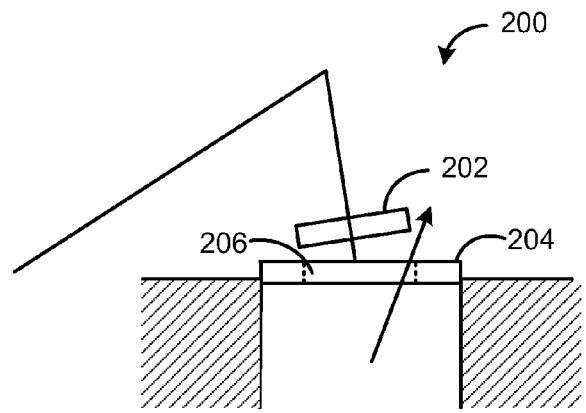
Figure 2C:
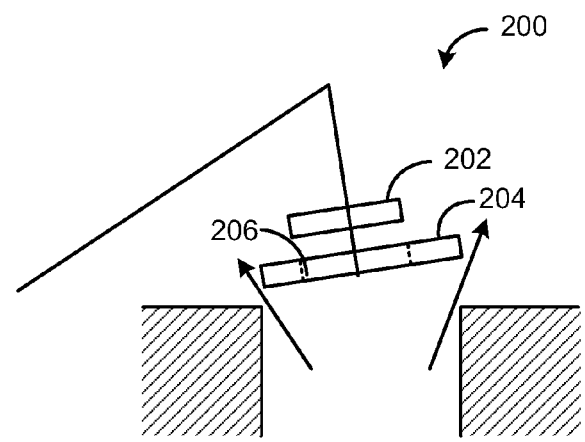

FIGS. 2A-2C depict a two-staged wastegate 200 according to an embodiment of the present disclosure. Wastegate 200 is one non-limiting example of wastegate 26 of FIG. 1, and is positioned in a bypass line around a turbocharger turbine, such as turbine 62 of FIG. 1. FIG. 2A depicts wastegate 200 in a closed position. Wastegate 200 includes a first stage 202 positioned substantially on a second stage 204. Second stage 204 includes an opening 206 configured to admit exhaust gas. First stage 202, when in a closed position, seals opening 206. Thus, when wastegate 200 is in a fully closed position, no exhaust gas bypasses the turbine.

FIG. 2B illustrates wastegate 200 in a semi-open position. First stage 202 has been opened, allowing exhaust gas (illustrated by the arrows in FIGS. 2B and 2C) to pass through opening 206 and bypass the turbine. First stage 202 may be opened by a suitable mechanism such as via a vacuum actuator or electronically, in response to a signal sent by a controller. In the semi-open position, second stage 204 remains closed so that a first, smaller amount of exhaust gas bypasses the turbine via wastegate 200.

FIG. 2C illustrates wastegate 200 in a fully open position. Second stage 204 has been opened in response to a signal from a controller. Similar to first stage 202, second stage 204 may be opened via a vacuum actuator, electronically, or other suitable mechanism. In the fully open position, a second, larger amount of exhaust gas bypasses the turbine via the wastegate 200. While first stage 202 is depicted in FIG. 2C as remaining in an open position when the second stage 204 is opened, other configurations are possible. For example, when the second stage is opened, first stage may be closed. In some embodiments, the first stage may move contiguously with the second stage such that, if the first stage is open when the second stage is commanded open, the first stage may remain in its open position when the second stage is open. If the first stage is closed when the second stage is commanded open, the first stage may remain in its closed position when the second stage is open. In other embodiments, the first stage may have a default position, whether open or closed, that it resumes when the second stage is opened.

First stage 202 and second stage 204 may be sized to provide optimal bypass of the turbine for various operating conditions. First stage 202 may be smaller than second stage 204. For example, first stage 202 may be sized to regulate an opening sized similar to conventional wastegate openings. Second stage 204 may be sized to control a larger opening to facilitate a greater amount of bypass than is typically utilized to regulate boost pressure.

While FIGS. 2A-2C illustrate a wastegate with a first stage positioned directly on top of and configured to regulate an opening within a second stage, other wastegate configurations are possible. For example, the valve may be a flap valve with a first flap that opens to admit a smaller amount of exhaust gas than admitted by a second flap. Additionally or alternatively, the valve may include more than two stages to provide further differing amounts of exhaust bypass.

Turning to FIG. 3, a method 300 for controlling a multi-stage wastegate is illustrated. Method 300 may be carried out by a controller according to instructions stored thereon to regulate a wastegate, such as wastegate 26 and/or wastegate 200. Method 300 includes, at 302, determining engine operating parameters. Engine operating parameters may include engine speed, engine load, engine temperature, boost pressure, catalyst temperature, etc. At 304, method 300 includes determining if catalyst temperature is below a threshold. Catalyst temperature may be determined by a temperature sensor located in or near the catalyst, or may be estimated based on operating conditions such as engine temperature and exhaust mass air flow. The temperature threshold may be a fixed temperature, such as catalyst light-off temperature, below which the catalyst may not suitably convert emissions in the exhaust. If the catalyst temperature is not below the threshold, method 300 proceeds to 310, which will be explained in more detail below.

If the catalyst temperature is below the temperature threshold, method 300 proceeds to 306 to open the second stage of the wastegate. By opening the second stage, a relatively larger amount of exhaust gas bypasses the turbine prior to reaching the catalyst, than when the first stage of the wastegate is opened. Thus, additional cooling to the exhaust gases provided by passage through the turbine may be avoided, and the catalyst may rapidly reach light-off temperature. To compensate for the airflow disturbances that may be present due to the large amount of exhaust bypassing the turbine, additional operating parameters may be adjusted at 308. For example, the turbine may not admit a sufficient amount of exhaust to effectively operate the compressor. Thus, intake air may be allowed to bypass the compressor via opening of the compressor bypass valve (CBV). The CBV may be opened concurrently with the second stage of the wastegate. Additional operating parameters may also be adjusted to compensate for the reduced intake air compression, such as adjusting the throttle, air-fuel ratio, etc.

Returning to 304, if the catalyst temperature is not below the threshold, method 300 proceeds to 310 to determine if desired boost pressure is less than measured boost pressure. Boost pressure may be measured by a sensor, such as sensor 123 of FIG. 1. Desired boost pressure may be a function of engine speed, driver-requested torque, and/or other parameters. If desired boost is not less than measured boost, method 300 proceeds to 312 to close or maintain the first and second stages in the fully closed position, in order to direct the exhaust immediately upstream of the turbine through the turbine without bypass, thus providing maximal boost to reach the desired boost level. If the desired boost pressure is less than the measured boost pressure, method 300 proceeds to 314 to open the first stage of the wastegate based on the desired boost pressure. The first stage of the wastegate may be opened by an amount corresponding to the difference between the desired boost and the measured boost. Further, at 316, the second stage of the wastegate is maintained in the closed position, in order to allow a smaller amount of exhaust to bypass the turbine.

Figure 4:
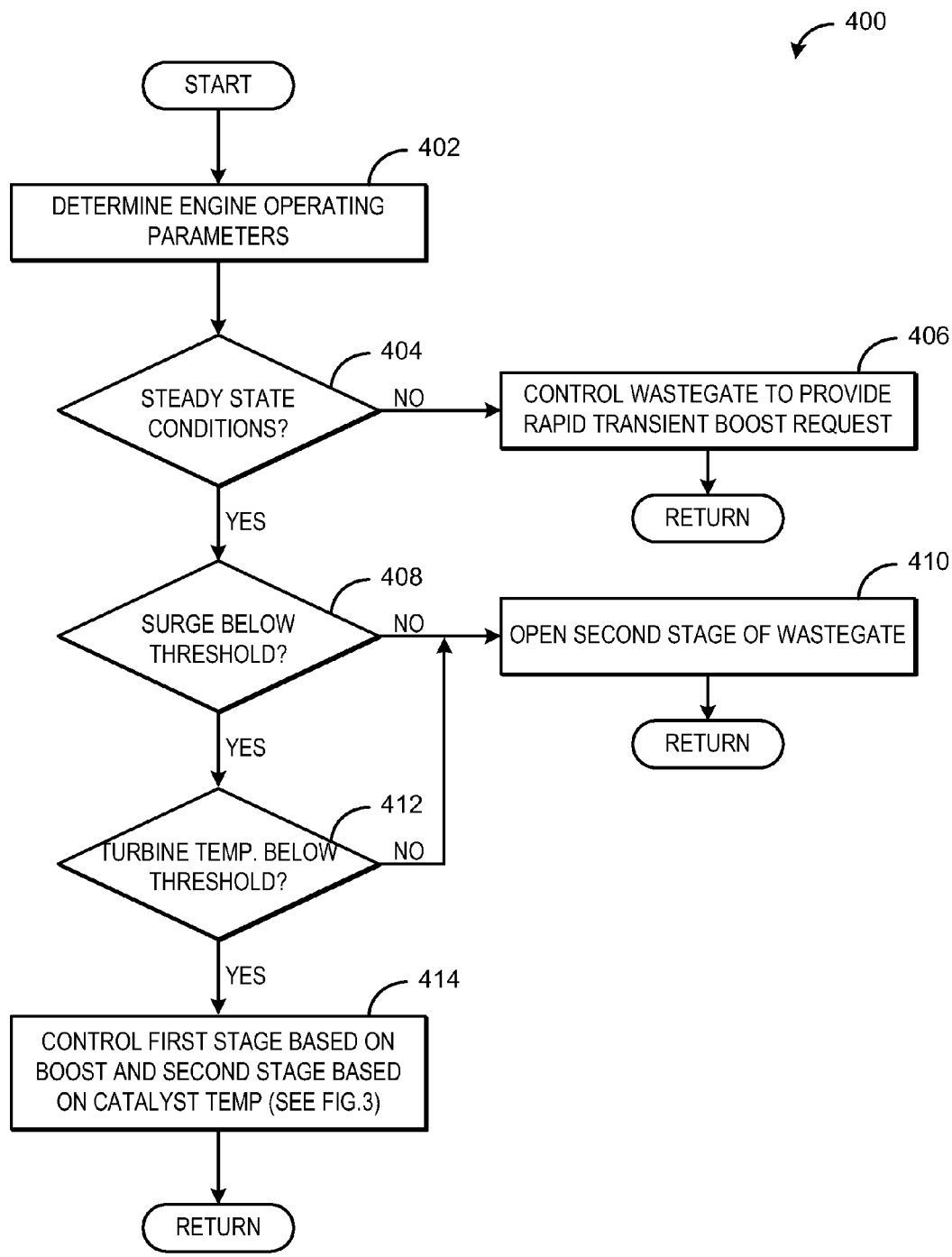
FIG. 4 is a flow chart illustrating a method for controlling a multi-stage wastegate according to another method of present disclosure.

While FIG. 3 illustrates control of a multi-stage wastegate based on boost pressure and catalyst temperature, under some conditions, the wastegate may be regulated based on additional operating parameters. FIG. 4 is a flow chart illustrating a method 400 for adjusting wastegate position during various operating conditions. Method 400 includes, at 402, determining engine operating parameters. These operating parameters may include engine speed and load, engine temperature, boost pressure, MAF, MAP, etc. At 404, it is determined if the engine is operating in steady state conditions. Steady state conditions may include engine speed and load and other operating parameters remaining relatively constant over a given duration. If steady state conditions are not indicated, the engine may be operating under a transient condition, such as a sudden torque request due to a driver-tip in event, or a drop in torque due to a driver tip-out. As such, the amount of desired boost pressure may change quickly. Thus, if the engine is not operating in steady state conditions, method 400 proceeds to 406 to control the wastegate to provide a rapid transient boost request. Depending on the type of transient condition, controlling the wastegate to provide a rapid transient boost request may include closing the second stage of the wastegate, even if catalyst temperature is below the threshold, to avoid a drop in boost pressure during the transient condition. During other transient conditions, the second stage may be opened, even if catalyst temperature is above the threshold, to prevent possible compressor surge and/or turbine degradation during the transient condition.

If the engine is operating under steady state conditions, method 400 proceeds to 408 to determine if the compressor is operating with surge below a threshold. Compressor surge may be a result of a high pressure ratio across the compressor combined with a low flow through the compressor, and may result in noise and compressor degradation. The threshold surge may be an amount of surge higher than can be relieved by opening the first stage of the wastegate and/or the CBV. Thus, if the compressor surge is above the threshold, method 400 proceeds to 410 open the second stage of the wastegate to provide maximal bypass to lessen the pressure ratio across the compressor and relieve surge. The second stage may be opened in these conditions even if the catalyst is at its warmed up operating temperature.

If the compressor is operating with surge below the threshold, method 400 proceeds to 412 to determine if the turbine temperature is below a threshold. During certain conditions, such as during a lean operation or during a regeneration event of a downstream emission control device, the exhaust may be heated to such high levels that turbine degradation is possible. To avoid this degradation, the exhaust may be routed to the catalyst without passing through the turbine. If the turbine is above the threshold temperature, method 400 proceeds to 410 to open the second stage of the wastegate in order to bypass the high-heat exhaust gas around the turbine. If the turbine is below the threshold temperature, method 400 proceeds to 414 to control the first stage of the wastegate based on boost pressure and the second stage of the wastegate based on catalyst temperature, as described above with respect to FIG. 3.

Figure 5:
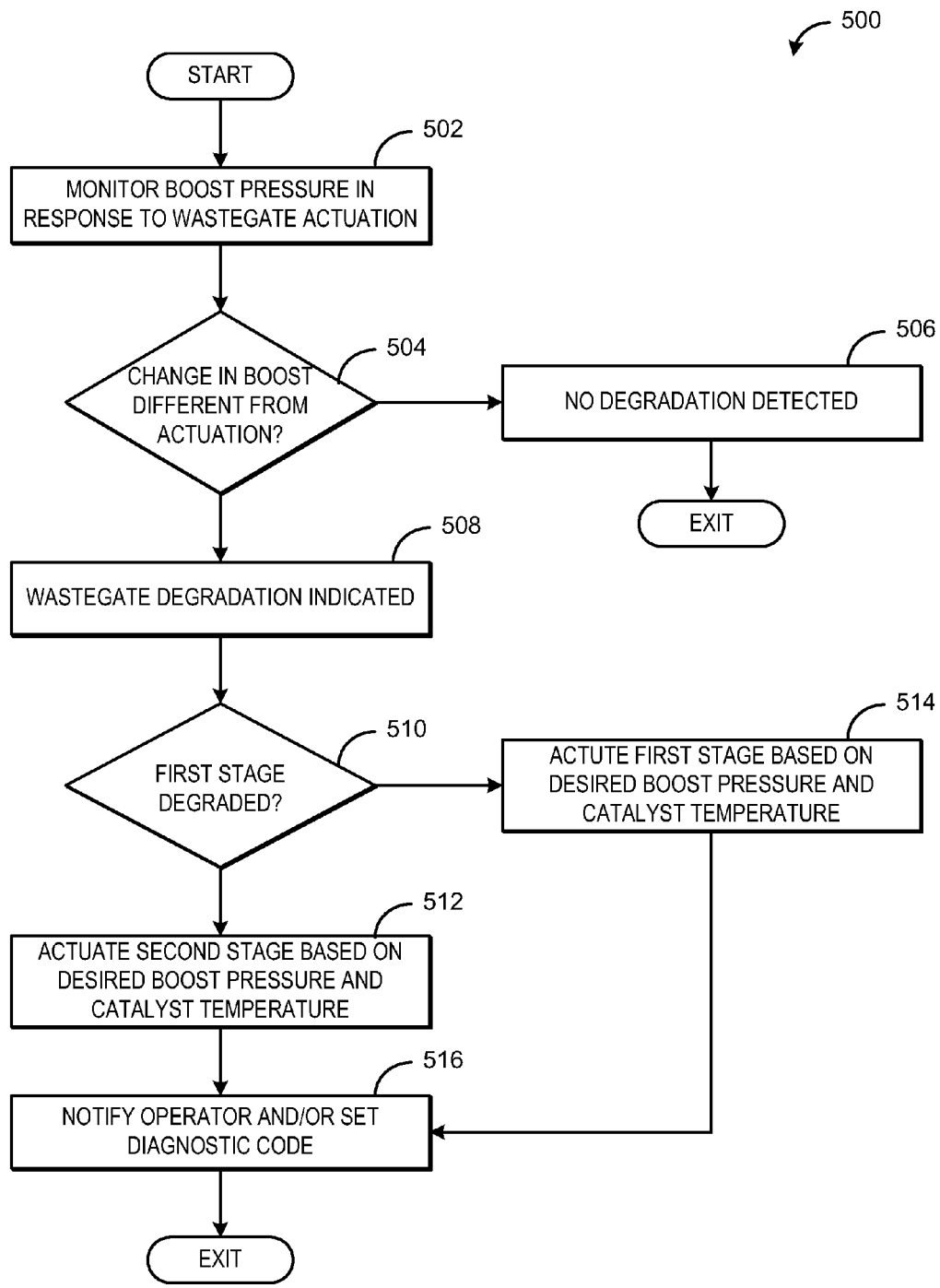
FIG. 5 is a flow chart illustrating a method for determining degradation of a multi-stage wastegate according to an embodiment of present disclosure.

As explained with respect to FIGS. 3 and 4, controlling the wastegate such that the second stage may be opened independently of the first stage provides for optimal boost regulation as well as avoiding potential turbine and compressor degradation and/or maintaining stringent emission control. However, such control relies on proper operation of both the first and second stages. Were degradation of one of the stages to occur, FIG. 5 illustrates a method 500 that may be carried out to maintain control in response to wastegate degradation. Method 500 may be carried out during conditions where fluctuations in boost pressure may be attributed only to changes in the wastegate position, e.g., during steady state conditions.

At 502, method 500 includes monitoring boost pressure in response to wastegate actuation. When either the first or second stage is commanded open, the amount of boost pressure provided by the turbocharger should drop; if a stage is open and commanded closed, the amount of boost pressure should increase. If the boost pressure does not change in a manner corresponding to actuation of the wastegate, degradation of one of the stages may be indicated. Thus, at 504, method 500 includes determining if the change in boost pressure differs from wastegate actuation. For example, if the first stage is opened, boost pressure should decrease by an amount corresponding to the position of the first stage. If boost pressure remains the same or does not decrease by an expected amount, degradation of the first stage may be indicated. If the amount of boost and actuation do not differ, method 500 proceeds to 506 to indicated no degradation, and then method 500 exits.

If the amount of boost and the amount of actuation do differ, method 500 proceeds to 508 to indicate wastegate degradation, and at 510 determines if the first stage of the wastegate is degraded, for example by determining which stage was actuated during the monitoring of 502. Alternatively or additionally, both the first and second stages may be commanded closed, the first stage may then be commanded open, and subsequent change in boost pressure monitored to verify if the first stage is degraded. If the first stage is degraded, method 500 proceeds to 512 control the actuation of the second stage of the wastegate based on boost pressure and catalyst temperature. In this way, even if the first stage is degraded, some boost regulation may be provided by the second stage; as the second stage controls an opening that is larger than the opening controlled by the first stage, the boost regulation provided by the second stage may be a coarser regulation than provided by the first stage.

If the first stage is not degraded, the second stage is indicated as degraded, and method 500 proceeds to 514 to control the actuation of the first stage of the wastegate based on boost pressure and catalyst temperature. This may include opening the first stage of the wastegate when catalyst temperature is below the threshold (such as when catalyst temperature is below light-off temperature), even if measured boost pressure is not greater than desired boost pressure. Following both 512 and 514, method 500 proceeds to 516 to notify an operator of the vehicle of the degradation, for example by lighting a malfunction indicator lamp, and/or set a diagnostic code indicating degradation of the first and/or second stage of the wastegate.

Thus, the methods and systems described herein provide for a method of controlling a turbocharger of an engine via a multi-staged wastegate. The method includes during a first condition, actuating a first stage of the wastegate based on boost pressure generated by the turbocharger and actuating a second stage of the wastegate based on a temperature of a catalyst downstream of the turbocharger. The method also includes, during a second condition, actuating the second stage of the wastegate based on both boost pressure and the temperature of the catalyst. The first condition may comprise a non-degradation state of the wastegate, and the second condition may comprise degradation of the first stage of the wastegate.

In another example, a method comprises during a first set of conditions, bypassing a first amount of exhaust gas around a turbocharger via a first opening controlled by a first stage of a wastegate, and during a second set of conditions, bypassing a second, larger amount of exhaust gas around the turbocharger via a second opening controlled by a second stage of the wastegate.

In a further example, an engine system comprises an exhaust system including a turbocharger turbine upstream of a catalyst, a two-staged wastegate, and a controller including instructions to, when catalyst temperature is above a threshold, actuate a first stage of the two-staged wastegate based on boost pressure while keeping a second stage of the two-staged wastegate closed, and when catalyst temperature is below the threshold, open the second stage of the two-staged wastegate.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a turbocharger of an engine via a multi-staged wastegate, comprising:
    during a first condition,
        actuating a first stage of the wastegate based on boost pressure generated by the turbocharger;
        actuating a second stage of the wastegate based on a temperature of a catalyst downstream of the turbocharger, the first stage of the wastegate regulating an opening positioned within the second stage of the wastegate; and
        actuating a compressor bypass valve concurrent with the actuating of the second stage of the wastegate.

2. The method of claim 1, wherein actuating the first stage of the wastegate further comprises opening the wastegate by a first, smaller amount, wherein actuating the second stage of the wastegate further comprises opening the wastegate by a second, larger amount, and further comprising, during transient conditions, actuating the second stage of the wastegate independent of the temperature of the catalyst, and wherein the first stage of the wastegate seals the opening positioned within the second stage of the wastegate when the first stage of the wastegate is fully closed.

3. The method of claim 2, wherein the multi-staged wastegate comprises a double-poppet valve, wherein actuating the second stage of the wastegate based on the temperature of the catalyst further comprises opening the second stage of the wastegate when catalyst temperature is below a first threshold, and wherein actuating the second stage of the wastegate independent of the temperature of the catalyst comprises opening the second stage of the wastegate during the transient conditions even if catalyst temperature is above the first threshold.

4. The method of claim 3, wherein actuating the second stage of the wastegate based on the temperature of the catalyst further comprises closing the second stage of the wastegate when catalyst temperature is above a second threshold.

5. The method of claim 3, wherein actuating the compressor bypass valve concurrent with the actuating of the second stage of the wastegate further comprises opening the compressor bypass valve when catalyst temperature is below the first threshold.

6. The method of claim 3, further comprising determining a desired boost pressure according to engine operating conditions, and actuating the first stage of the wastegate according to a difference between measured boost pressure and the desired boost pressure.

7. The method of claim 3, further comprising during a second condition, actuating the second stage of the wastegate based on both boost pressure and the temperature of the catalyst.

8. The method of claim 7, wherein the first condition comprises a non-degradation state of the wastegate, and wherein the second condition comprises degradation of the first stage of the wastegate.

9. An engine system comprising:
    an exhaust system including a turbocharger turbine upstream of a catalyst;
    a two-staged wastegate including a first stage arranged on top of a second stage, the second stage including an opening configured to admit exhaust gas when the first stage is open;
    a compressor of the turbocharger arranged in an intake of the engine; and
    a controller including instructions stored in a memory to:
        responsive to steady state conditions when catalyst temperature is above a threshold, actuate the first stage of the two-staged wastegate based on boost pressure while keeping the second stage of the two-staged wastegate closed;
        responsive to steady state conditions when catalyst temperature is below the threshold, open the second stage of the two-staged wastegate and open a compressor bypass valve corresponding to the opening of the second stage of the two-staged wastegate; and
        responsive to a transient condition, actuate the second stage of the two-staged wastegate independent of the catalyst temperature.

10. The engine system of claim 9, wherein the threshold temperature is catalyst light-off temperature, and wherein the first stage of the two-staged wastegate is smaller than the second stage of the two-staged wastegate.

11. The engine system of claim 9, wherein the controller includes further instructions to, when catalyst temperature is below the threshold, maintain the first stage of the two-staged wastegate in a default position.

12. A method comprising:
    responsive to a first set of conditions including catalyst temperature above a temperature threshold, bypassing a first amount of exhaust gas around a turbocharger via a first opening controlled by a first stage of a wastegate; and
    responsive to a second set of conditions, bypassing a second, larger amount of exhaust gas around the turbocharger via a second opening controlled by a second stage of the wastegate, the first opening arranged within the second stage of the wastegate, and bypassing an amount of intake air around a compressor via a compressor bypass valve concurrent with the bypassing of the second amount of exhaust gas around the turbocharger.

13. The method of claim 12, wherein the first set of conditions further comprises boost pressure greater than a boost threshold.

14. The method of claim 13, wherein the second set of conditions comprises catalyst temperature below the temperature threshold.

15. The method of claim 13, wherein the first set of conditions further comprises turbine temperature below a threshold, and wherein the second set of conditions comprises turbine temperature above the threshold.

16. The method of claim 13, further comprising, when catalyst temperature is above the temperature threshold and boost pressure is less than the boost threshold, blocking bypass of the turbocharger by closing the first and second openings with the first and second stages of the wastegate.

17. The method of claim 12, wherein bypassing the first amount of exhaust via the first opening further comprises admitting the first amount of exhaust through the first opening.

18. The engine system of claim 9, wherein the controller includes further instructions to, if compressor surge is above a surge threshold, open the second stage of the two-staged wastegate independent of the catalyst temperature.

\* \* \* \* \*